United States Patent Office 2,866,796
Patented Dec. 30, 1958

2,866,796

17-OXYGENATED 4,4-DIACETOXYESTRA-1, 5(10)-DIEN-3-ONES

James Jiu, Morton Grove, Ill., assignor to G. D. Searle & Co., Chicago, Ill., a corporation of Delaware No Drawing. Application December 26, 1957
Serial No. 705,146

3 Claims. (Cl. 260—397.4)

This invention relates to 17-oxygenated 4,4-diacetoxy-estra-1,5(10)-dien-3-ones and processes for the manufacture thereof. More particularly, this invention relates to products of the formula

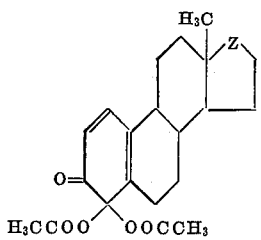

wherein Z represents a carbonyl, hydroxymethylene, or (lower alkyl) hydroxymethylene radical.

It will be recognized by those skilled in the art that carbonyl radicals necessarily have the formula

hydroxymethylene radicals the formula

and (lower alkyl) hydroxymethylene radicals the formula

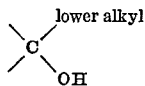

the lower alkyl radicals designated being such as methyl, ethyl, propyl, isopropyl, butyl, isobutyl, sec.-butyl, tert.-butyl, pentyl, isopentyl, tert.-pentyl, neopentyl, hexyl, isohexyl, heptyl, octyl, and the like $C_nH_{2n+1}$ radicals wherein $n$ is a positive integer amounting to less than 9.

The compounds of this invention are useful because of their valuable pharmacological activity. Thus, for example, they manifest estrogenic properties uncomplicated by anti-hormonal responses typical of other, superficially-related materials.

Manufacture of the subject compositions proceeds from an appropriate starting material of the formula

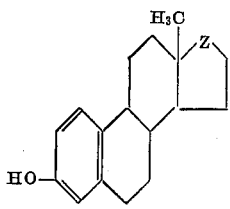

which, on heating with lead tetraacetate in the presence of glacial acetic acid, yields the corresponding diacetate.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials are in parts by weight, except as otherwise noted.

EXAMPLE 1

*4,4-diacetoxyestra-1,5(10)-diene-3,17-dione*

To a suspension of 80 parts of estrone in 2000 parts of glacial acetic acid maintained at less than 30° C. is added, portionwise over a 10-minute period with agitation, 329 parts of lead tetraacetate. Agitation in the specified temperature range is continued for an additional 20 minutes, at which point the reaction mixture is dumped into ice water. The resultant mixture, in turn, is extracted with chloroform and the chloroform extract is dried over anhydrous sodium sulfate. Evaporation of solvent under reduced pressures leaves a residue which is purified by chromatography on magnesium silicate, using a 4:1 volumetric ratio of benzene to hexane as the developing solvent. There is obtained by this means 4,4-diacetoxyestra-1,5(10)-diene-3,17-dione, which, recrystallized from methanol, melts in the range, 206–212° C. The product has the formula

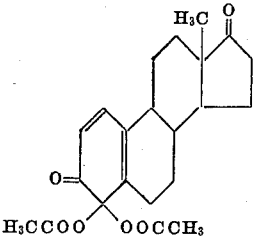

Also isolated in the chromatography work up is 10-acetoxyestra-1,4-diene-3,17-dione, a compound somewhat more firmly adsorbed on the magnesium silicate, and which, likewise recrystallized from methanol, melts at 255–258° C.

EXAMPLE 2

*4,4-diacetoxy-17β-hydroxyestra-1,5(10)-dien-3-one*

To a suspension of 25 parts of 17β-estradiol in 500 parts of glacial acetic acid at 25–35° C. is added, portionwise over a 10-minute period with agitation, 101 parts of lead tetraacetate. Agitation in the specified temperature range is continued for an additional 20 minutes, at which point the reaction mixture is dumped into ice water. The resultant mixture, in turn, is extracted with benzene; and the benzene extract is dried over anhydrous sodium sulfate. Evaporation of solvent under reduced pressures leaves a residue which is purified by chromatography on magnesium silicate, using benzene and ethyl acetate as developing solvents. In an eluate comprising 1 part of ethyl acetate for each 19 parts of benzene there is obtained, on evaporation of solvent, a residue which, recrystallized from ethyl acetate, melts at 184–188° C. This material is 4,4-diacetoxy-17β-hydroxyestra-1,5(10)-dien-3-one of the formula

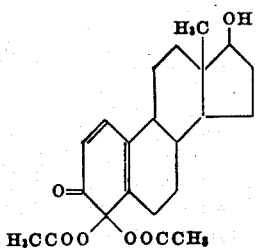

Also isolated in the chromatography work up is 10-acetoxy-17β-hydroxyestra-1,4-dien-3-one, a compound somewhat more firmly adsorbed on the magnesium silicate, and which, likewise recrystallized from the methanol, melts at 203–206° C.

What is claimed is:
1. A compound of the formula

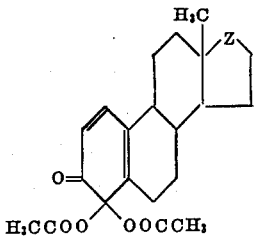

wherein Z is selected from the group consisting of carbonyl and hydroxymethylene radicals.
2. 4,4-diacetoxyestra-1,5(10)-diene-3,17-dione.
3. 4,4-diacetaxy-17β-hydroxyestra-1,5(10)-dien-3-one.

No references cited.